No. 847,442. PATENTED MAR. 19, 1907.
J. M. SHEPARD.
TIRE.
APPLICATION FILED NOV. 29, 1905.
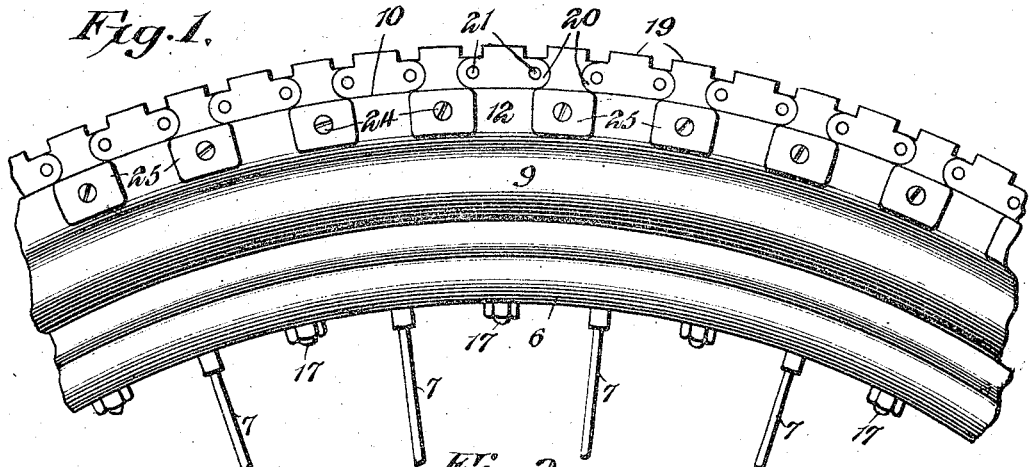
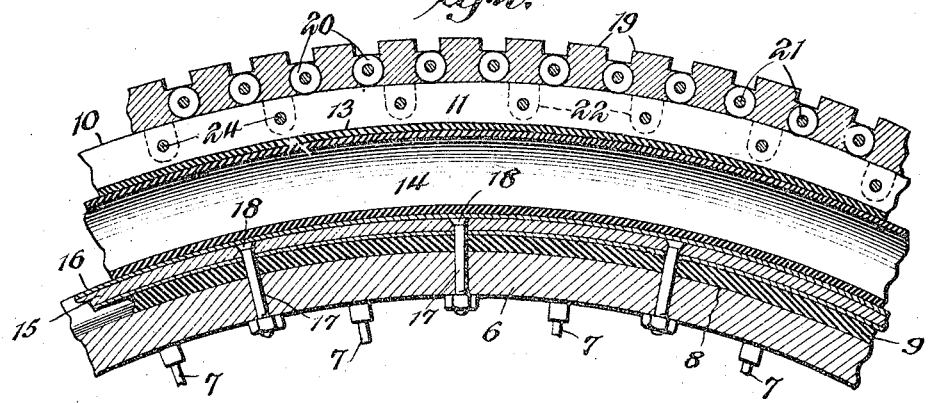
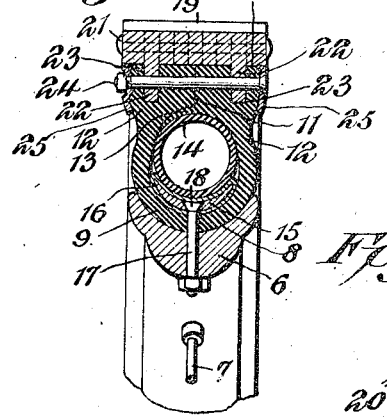
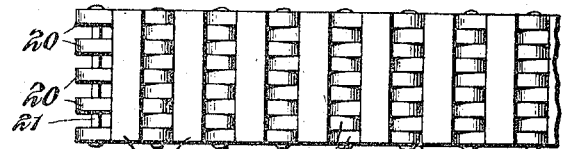
Witnesses
Howard D. Orr
B. G. Foster
Inventor,
James M. Shepard,
By
C. G. Siggers
Attorney

UNITED STATES PATENT OFFICE.

JAMES MILLER SHEPARD, OF FINDLAY, OHIO.

TIRE.

No. 847,442.   Specification of Letters Patent.   Patented March 19, 1907.

Application filed November 29, 1905. Serial No. 289,679

*To all whom it may concern:*

Be it known that I, JAMES MILLER SHEPARD, a citizen of the United States, residing at Findlay, in the county of Hancock and State of Ohio, have invented a new and useful Tire, of which the following is a specification.

This invention relates more particularly to tires for automobiles and the like vehicles, though perhaps adaptable for advantageous use in other relations.

One of the principal objects is to provide simple and yet peculiarly effective means for securing the tire to the wheel-rim, so that said tire cannot creep nor is there liability of the parts becoming chafed or unduly worn.

Another and important object is to provide a tire wherein the casing opens on its outer side in order that the inner tube or other support may be removed and replaced without the necessity of detaching the casing from the wheel, and in this connection a further feature resides in the provision of novel means for securing the tread member over the casing, so that the outer joint thereof is completely protected.

An embodiment of the invention that is at present considered the preferable one is illustrated in the accompanying drawings and is described in the following claims. An inspection of the claims will show, however, that said invention is not limited to this one disclosure.

In the drawings, Figure 1 is a side elevation of a portion of a wheel and a portion of the improved tire located thereon. Fig. 2 is a longitudinal sectional view through the same. Fig. 3 is a cross-sectional view. Fig. 4 is a plan view of a portion of the tread member. Fig. 5 is a detail perspective view of one of the links of said tread member.

Similar reference-numerals designate corresponding parts in all the figures of the drawings.

In the embodiment illustrated a portion of a wheel-rim 6 is disclosed, which is carried by spokes 7. The structure of the rim and wheel is not important and may be varied, as desired, the rim, however, having the usual annular channel 8. A casing 9, curved on its inner side to conform to the channel 8, has said inner side located in the channel. Its outer side is thickened and provided with a flat outer face 10. Said outer side, moreover, is provided with a longitudinal joint 11, dividing the same into sections 12. A tongue 13, carried by one of the inner portions of the sections, overlaps the joint between said sections, as clearly shown in Fig. 3. Located within the casing is a suitable air-tube 14, constituting the usual support for said casing, and this air-tube is removable through the outer side. The structure thus far described constitutes a yielding tire-body which will absorb the shocks and jars incident to travel.

For the purpose of securing the above described tire-body to the rim 6 a clamping-strip 15 is employed, which is interposed between the inner side of the casing and the inner side of the tubular support 14, conforming in cross-sectional configuration to the same. This strip is preferably made of metal, and in order to prevent its wearing the casing and inner tube it preferably has a sheathing or protective covering 16 of suitable cushioning material, such as fabric. Bolts 17 have heads 18 countersunk in the strip, said bolts passing through the inner side of the casing 9 and through the rim 6 between the spokes. By this means it will be seen that the tire-body is efficiently secured to the wheel-rim and is positively held against creeping. At the same time the position and arrangement of the clamping strip and bolts does not interfere with the removal or replacement of the inner tube 14, and said inner tube can thus be passed through the outer side of the casing without the necessity of removing the latter. Also it will be evident that the strip and the bolts carried thereby can also be passed through said outer side.

Surrounding the yielding tire-body and bearing against the outer flat side 10 of the casing is a tread member which is composed of a series of hinged or pivotally-connected links. Each link comprises a transverse antislipping-bar 19, provided on its opposite sides with a series of ears 20, the ears 20 of one link interfitting with those of the adjacent links and being pivoted thereto by rivets or other suitable devices 21.

It will be observed by reference to Figs. 1 and 2 that the outer sides of the ears terminate short of the outer sides of the bars, leaving spaces between said bars and forming a roughened antislipping or antiskidding surface. Certain of the links are provided with inwardly-extending ears 22, and any number of these ears may be employed, as desired, depending, of course, on the size and character of the tire. In the present instance two sets of ears are shown. Each section 12 of the outer side of the casing has sockets 23 to receive the ears. Bolts 24, passing transversely through the sections, also pass through the ears, as shown in Fig. 3. These bolts thus constitute not only means for securing the tread member to the casing, but also act as means for fastening the sections of the outer wall of the casing together, thus securely maintaining the joint between said sections in closed condition. Suitable washers 25 are preferably arranged at the ends of the bolts and serve to prevent the heads and nuts from being drawn into the material of the casing.

The circular clamp hoop or binder 15 is an important feature in that it not only constitutes, in connection with the bolts, a secure fastener, but that it is entirely out of the way, particularly so in connection with the joint in the outer side of the casing which, as already described, permits the passage of the inner tube without the necessity of removing the tire from the wheel. At the same time it will be observed that this joint is completely covered and protected by the tread member, and common means are employed for holding said tread member in place and the joint in closed condition. In view of the flexible structure of the tread member the yielding of the tire-body is not materially interfered with, and thereby a puncture proof durable tire is provided having in addition the desirable qualities of the pneumatic tire.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a tire, the combination with a yielding tire-body having an outer side provided with spaced sockets, of a tread member having spaced ears located in the sockets, and fastening devices passing transversely through the outer side of the body and through the ears, each fastening device passing through a plurality of the ears.

2. In a tire, the combination with a casing having an outer sectional side, of a tread member mounted on the outer side and comprising a series of pivotally-connected links, said tread member bridging the joint between the sections of the side and having certain links interlocked with both sections, other links between said interlocked links being disposed out of interlocking engagement with said sectional side and fastening devices extending transversely through the sectional side across the joint between the sections thereof and engaging the links of the tread member that are interlocked with said sections.

3. In a tire, the combination with a casing having an outer sectional side, the sections of said side being provided with sockets on opposite sides of the joint, of a tread member mounted on the outer side, said tread member bridging the joint between the sections thereof, and having ears engaging in the sockets on opposite sides of the joint, and means for fastening the tread member to the outer side.

4. In a tire, the combination with a casing having an outer sectional side, the sections of said side being provided with sockets on opposite sides of the joint, of a tread member mounted on the outer side, said tread member bridging the joint between the sections thereof, and having ears engaging in the sockets on opposite sides of the joint, and transverse locking-bolts passing through the sectional side across the joint between the sections thereof and engaging the ears that are located in the sockets.

5. In a tire, the combination with a yielding tire-body having an outer side provided with spaced sockets, of a tread member having spaced ears located in the sockets, and bolts passing transversely through the outer side of the body and through the ears.

6. In a tire, the combination with a casing having an outer sectional side, the sections of said side being provided with sockets, of a tread member comprising a series of pivotally-connected links, certain of said links having inwardly-extending ears that are located in the sockets, and fasteners passing transversely through the sections of the outer side and through the ears.

7. In a tire, the combination with a casing having an outer thickened side composed of sections, of an air-tube arranged within the casing and removable through the outer side thereof, a clamping-strip interposed between the inner side of the air-tube and the inner side of the casing and having bolts passing through said casing, the sections of the outer thickened side of the casing having sockets, a tread member comprising a series of pivotally-connected links, certain of said links having inwardly-extending ears arranged in the sockets, and bolts passing transversely through the sections of the outer side for securing the same together, said bolts also passing through the ears and thereby securing the tread member to the casing.

8. In a tire, the combination with a yielding tire-body having sockets in its outer side, of a tread member surrounding the body, said member comprising a series of links composed of transverse bars and ears extending on opposite sides of the bars, the ears of one link interfitting with and being pivoted to the ears of the link next adjacent, certain of said links also having inwardly-extending ears located in the sockets, and fasteners passing transversely through the tire-body and through the inwardly-extending ears that are fitted in the socket.

9. In a tire, the combination with a casing, of a tread member mounted thereon and comprising a series of links, each link consisting of a cross-bar extending the full width of the link and having oppositely-extending ears that project from the opposite edges of the cross-bar and terminate short of the outer side of said cross-bar, the ears of one link being pivotally interlocked with the ears of the next adjacent link, leaving the cross-bars spaced apart and projecting to provide an antislipping roughened surface on the tire.

10. In a tire, the combination with a casing having a sectional outer wall, of a tread member extending over said outer wall and comprising a series of links, each link consisting of a cross-bar having oppositely-extending ears that terminate short of the outer side of the cross-bar, the ears of one link being pivotally interlocked with the ears of the next adjacent link, leaving the cross-bars spaced apart and projecting outwardly to provide an antislipping roughened tread-surface on the tire, said cross-bars of the links having inwardly-extending ears between their ends that engage in the sections of the outer casing-wall, and means engaging said ears to hold the same in place and secure the sections of the wall together.

In testimony that I claim the foregoing as my own I have hereto affixed my signature in the presence of two witnesses.

JAMES MILLER SHEPARD.

Witnesses:
  FRED HEIMHOFER,
  VIOLA MAY BELLINGER.